US012504146B2

(12) United States Patent
Mueller et al.

(10) Patent No.: US 12,504,146 B2
(45) Date of Patent: Dec. 23, 2025

(54) TEMPERATURE CONTROL MODULE AND HEADLIGHT

(71) Applicant: MERCEDES-BENZ GROUP AG, Stuttgart (DE)

(72) Inventors: Axel Mueller, Schorndorf (DE); Anton Nelson, Ammerbuch (DE); Janik Kaiser, Radolfzell (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/856,320

(22) PCT Filed: Mar. 9, 2023

(86) PCT No.: PCT/EP2023/056071
§ 371 (c)(1),
(2) Date: Oct. 11, 2024

(87) PCT Pub. No.: WO2023/198372
PCT Pub. Date: Oct. 19, 2023

(65) Prior Publication Data

US 2025/0257860 A1 Aug. 14, 2025

(30) Foreign Application Priority Data

Apr. 12, 2022 (DE) ..................... 10 2022 001 240.5

(51) Int. Cl.
*F21S 45/43* (2018.01)
*F21S 45/33* (2018.01)
(Continued)

(52) U.S. Cl.
CPC ............... *F21S 45/43* (2018.01); *F21S 45/33* (2018.01); *F21V 29/54* (2015.01); *F21V 29/677* (2015.01)

(58) Field of Classification Search
CPC ......... F21S 45/43; F21V 29/54; F21V 29/677
See application file for complete search history.

(56) References Cited

U.S. PATENT DOCUMENTS 11,873,965 B2 1/2024 Lee

FOREIGN PATENT DOCUMENTS

DE 102007057056 A1 5/2009
DE 102011089945 A1 6/2013
(Continued)

OTHER PUBLICATIONS

International Search Report and Written Opinion dated Jun. 6, 2023 in related/corresponding International Application No. PCT/EP2023/056071.
(Continued)

*Primary Examiner* — Sean P Gramling
(74) *Attorney, Agent, or Firm* — PATENT PORTFOLIO BUILDERS PLLC

(57) ABSTRACT

A temperature control module includes a separation element having a closed middle section and heat-conducting elements on two sides of the middle section, as well as a conveying device for air. The conveying device is designed as an integrated twin fan, which on the one hand conveys ambient air from the one side of the middle section and on the other hand conveys ambient air from the other side of the middle section to the separation element. The middle section has a Peltier element or is designed as such. The temperature control module can be used in a headlight for cooling and/or heating its internal volume.

12 Claims, 2 Drawing Sheets

(51) Int. Cl.
*F21V 29/54* (2015.01)
*F21V 29/67* (2015.01)

(56) References Cited

FOREIGN PATENT DOCUMENTS

| | | | | |
|---|---|---|---|---|
| EP | 2020569 | A2 | 2/2009 | |
| FR | 3058503 | A1 * | 5/2018 | ............ F21S 41/147 |
| JP | H05147437 | A | 6/1993 | |
| JP | 2014065334 | A | 4/2014 | |
| KR | 20140060828 | A | 5/2014 | |
| KR | 1020180000550 | A | 1/2018 | |
| KR | 102344337 | B1 | 12/2021 | |
| WO | 2019156088 | A1 | 8/2019 | |

OTHER PUBLICATIONS

Office Action created Dec. 7, 2022 in related/corresponding DE Application No. 10 2022 001 240.5.
Office Action dated Sep. 4, 2025 in related/corresponding JP Application No. 2024-559136.

* cited by examiner

TEMPERATURE CONTROL MODULE AND HEADLIGHT

BACKGROUND AND SUMMARY OF THE INVENTION

Exemplary embodiments of the invention relate to a temperature control module having a separation element, as well as to a headlight having such a temperature control module, in particular for a motor vehicle.

Modern headlights have many components in the interior that emit heat during operation. Along with the LEDs typically used today as light sources, these are stepper motors and control devices. Due to the sometimes very high currents, the electrical resistance of the cabling also generates heat in the area of the cables and contacts. In order to avoid overheating of the typically self-enclosed internal volume of the headlight, as this would force a reduction in performance or could even cause component damage, this waste heat must be discharged from the internal volume of the headlight. Typically, the heat is transferred via the cover plate, which is also referred to as the front plate or cover glass. Particularly when used in vehicles, a relatively large amount of heat can be discharged as a result of the airstream flowing around the vehicle while it is travelling. The plastic housing of the headlight itself also contributes to heat transfer, but the materials used and the typical installation location with relatively small distances to surrounding components limit efficient heat transfer. Therefore, only a small part of the waste heat can be discharged via the housing, for example into the engine compartment of the vehicle.

One approach to improving the dissipation of waste heat is typically to use separation elements and a fan within the headlight in order to remove the waste heat specifically from the components producing the waste heat.

In addition to the operation of such a fan inside the enclosed volume of the headlight, it is also known from the state of the art to use a separation element having two sides, one of the sides being arranged inside the headlight and the other of the sides being arranged outside. In this context, reference can be made to DE 10 2007 057 056 A1. This basically describes such a separation element, wherein the heat-conducting connection between the sections located in the surroundings and the sections located inside the headlight takes place via a middle section, which is designed here as a thermoelectric cooler, i.e., for actively influencing the heat flow from the inside to the outside.

This construction, together with the fan arranged in the internal volume of the headlight, can reduce the temperature in the construction and also heat it up. However, the design is dependent on various ambient conditions, as a constant supply of air to the thermoelectric element must be guaranteed.

A further problem of such headlights is equalizing the pressure between the internal volume and the surroundings at different temperatures. This is not addressed by this prior art. In practice, however, air-permeable membranes and water vapor-impermeable membranes are frequently used for this purpose. This is quite complex in practice and requires additional installation space. Furthermore, it is the case that even a well-sealed headlight is never completely sealed against moisture. For example, moisture can penetrate the plastic material typically used for the housing. The construction can therefore fog up, however removal of the moisture through the membrane is not possible.

Exemplary embodiments of the present invention are directed to an improved integrated temperature control module which is improved in relation to the construction mentioned in the prior art and which can preferably be used in an improved headlight.

The temperature control module according to the invention represents an integrated temperature control module having a separation element on one side and a conveying device for air on the other side. The separation element comprises a closed middle section and heat-conducting elements on two sides of this middle section. According to the invention it is provided that the conveying device is designed as an integrated twin fan, which on the one hand conveys ambient air from the one side of the middle section and on the other hand conveys ambient air from the other side of the middle section to the separation element. The middle section of the separation element is therefore a plate with heat-conducting elements, for example, on the one and other side. Additionally, a Peltier element is integrated in the middle section, or the middle section is formed directly by such a Peltier element. By applying electrical voltage or power, heat can be created on one side and cold on the other side.

The sides can be switched when needed by reversing the poles of the electrical field. The temperature control module with the Peltier element can therefore create either heat or cold on one side, and thus heat or cool the air conveyed by the twin fan via the Peltier element or the middle section and the heat-conducting elements. The temperature control module therefore allows for efficient heating or cooling. In addition to active heating or cooling by the Peltier element, it also enables the naturally occurring heat flow from one side to the other to be increased or boosted, depending on the polarity used, so that waste heat can be discharged even faster.

Accordingly, according to a very advantageous design of the headlight, the twin fan is set up to circulate air in the internal volume and convey it to the separation element of the temperature control module on the one hand and to convey ambient air to the other side of the separation element on the other. Both air flows are physically separated in this case, i.e., the air does not mix. The heat is efficiently discharged from the headlight supported by the Peltier element, so that in addition to heat dissipation via the cover plate, heat can also be dissipated into another area, for example an engine compartment or similar.

A further very favorable embodiment of the temperature control module according to the invention can furthermore provide that a collection volume for condensate is arranged on one of the sides. As a result, moisture accumulating on this side during cooling by the Peltier element or during the (actively supported) waste heat removal from the area of this side, which condenses on the middle section, can be collected. The collection volume makes it possible to collect the moisture in its area and therefore to dry the recirculated air flow used in this case for cooling along the side with the collection volume.

According to an advantageous development of the integrated temperature control module, the heat-conducting elements can be designed as heat-conducting ribs or fins or also as heat-conducting fingers, pins or nubs. A combination of these elements or a combination with other measures that increase the surface area of the separation element on the respective side, such as roughening the surface or similar, are also conceivable.

The construction of the twin fan is fundamentally insignificant and can take any form. According to an extremely favorable development of the temperature control module according to the invention, it is however provided that the twin fan has two fan wheels sealed off from each other and a common electric drive motor for the two fan wheels. This construction is extremely simple and efficient and enables good functionality with less hardware, space and energy usage. Preferably, the one electric drive motor for the two fan wheels can be arranged centrally between the two fan wheels.

The twin fan can preferably be designed as a radial fan, so that it draws in the sucked-in air, for example laterally in relation to the respective side or its surface of the separation element, and then releases it again via the surface of the respective side of the middle section and preferably passing between the heat-conducting elements. Warm air can be efficiently conveyed on the one side to the heat-conducting elements in order to cool these down, for example. The waste heat that builds up is transported from the one side to the other side, and simultaneously cool air can be conveyed to the other side in the same way in order to efficiently discharge the heat transferred from the first side to the second side.

In this particularly favorable embodiment, it is then therefore the case that the twin fan is designed to convey the ambient air from the respective side of the separation element or its middle section on the pressure side to the heat-conducting elements and accordingly draw in the ambient air, preferably perpendicular to this direction in the case of the above-mentioned embodiment as a radial fan.

In principle, such a temperature control module can always be used as an integrated temperature control module wherever heat is to be transferred from one side to the other, especially in components with limited installation space, as the highly integrated and compact design made possible by the temperature control module according to the invention is particularly advantageous here.

This temperature control module can be integrated into a housing having supply air openings on two opposite sides for the air drawn in by the twin fan and exhaust air openings at a distance therefrom for the exhaust air after flowing through the heat-conducting elements of the separation element. The separation element and twin fan can therefore be arranged efficiently in such a housing. The housing can then be inserted into a suitable cut-out section in a wall. A screwed or also a clip connection can be provided for this purpose. The heat can then be transported from the one side of the wall to the other side. This can take place extremely simply and efficiently, by merely connecting one electrical terminal for the one drive motor and one for the Peltier element to a power source. The power can be supplied from either side of the wall, depending on which is more favorable in relation to installation.

A preferred application is in the area of a headlight. Such a headlight having a self-enclosed internal volume, having a transparent cover plate and illuminating means, which comprise at least light-emitting diodes, their control electronics and similar, can now be ideally cooled or heated via the temperature control module according to the invention. The headlight according to the invention provides that the middle section of the separation element of the temperature control module with the Peltier element forms a part of the boundary of the internal volume, so that the heat-conducting elements of the one side extend into the internal volume and the heat-conducting elements of the other side extend into the surroundings. The middle section with the Peltier element, or the middle section formed by the Peltier element, therefore forms a part of the housing of the headlight and can thus be integrated into the headlight in a very space-saving manner. The one side with one half of the twin fan is then in the interior and can cool or heat there as needed. The other side is outside, for example in the area of the engine compartment, and can be used for discharging heat in the case of cooling the headlight or also for providing heat from the engine compartment in the case of heating the headlight. The Peltier element can thus actively cool or heat on the one hand, and on the other hand it can increase the existing temperature differences, in order to enable improved heat conduction between its sides for cooling and heating.

According to a particularly favorable embodiment of the headlight according to the invention, this is now combined with an embodiment of the temperature control module according to the invention with the collection volume. The collection volume, which according to the invention is arranged in the internal volume of the headlight, can then be connected via a duct element to a sump volume for the condensate outside the internal volume in order to discharge the condensate. Moisture, which accumulates in the internal volume of the headlight, for example because the latter is not completely sealed or because moisture gets through the plastic material of the housing into the interior of the headlight, is therefore collected as condensate in the collection volume when cooling the headlight. The Peltier element then operates both as a cooling element and as a cold trap. The condensate then gets in its liquid state via the duct element for discharging condensate into a sump volume present outside of the internal volume of the headlight, and from there can be discharged simply and efficiently into the surroundings. Therefore, moisture which has penetrated into the internal volume of the headlight can be discharged efficiently when needed.

According to a further very favorable embodiment of the headlight according to the invention, it is provided that the duct element ends at the top in the sump volume in the direction of gravity when used as intended. The condensate can then drip from the end of the duct element into the sump volume. There is no direct connection between the duct element and the liquid condensate that collects at the bottom of the sump volume in the direction of gravity for the filling quantities that typically occur.

If there is an increase in pressure in the internal volume of the headlight, for example due to the light sources, stepper motors, electronic components or similar heating up, condensate is transported into the sump volume via the collection volume and the duct element. If the pressure conditions are reversed, no condensate can be conveyed back into the internal volume of the headlight due to the duct element ending above the surface of the condensate in the sump volume. Nevertheless, air can flow into the internal volume to equalize the pressure.

A further extremely favorable embodiment provides that the sump volume is sealed off and is connected to the surroundings on the one hand via the duct element and on the other a meandering tube arranged at the bottom in the direction of gravity when used as intended. Such a meandering tube allows for efficient connection to the surroundings, so that in the event of excess pressure inside the internal volume of the headlight, the condensate is pushed out from the sump volume via the tube into the surroundings. On the other hand, air can also be drawn in via the meandering tube and "sucked back" into the headlight or its internal volume if the pressure conditions are reversed. The meandering tube has the advantage that due to its meandering shape it can very efficiently prevent the penetration of dirt into the area of the sump volume and thus at least indirectly into the area of the internal volume of the headlight.

According to an extremely favorable development of this idea it can however also be provided in addition to the meandering embodiment of the tube that the flow-through cross-section of the meandering tube has a grate or filter element. Such a grate or filter element can be used to prevent, for example, relatively large dirt particles from blocking the meandering tube, insects from getting in or similar.

According to an extremely favorable embodiment of the headlight according to the invention, it can further be provided that the temperature control module is arranged below a cover in the internal volume, at least in relation to the air flow conveyed by it when the headlight is used as intended, which cover has ventilation openings. Such a cover can therefore be arranged such that the air flow conveyed by the temperature control module inside the headlight reaches the area of the cover from below when the headlight is used as intended, for example by the air being conveyed directly from below or also from behind under the cover and then guided specifically upwards via ventilation openings inside the cover. Preferably, the cover can be arranged below the cover plate, so that the conveyed air flow flows over this cover plate through the ventilation openings specifically from below. This is particularly advantageous when the headlight is to be heated, before example to make or keep it free of ice or to efficiently remove fogging on the cover plate, in particular on the interior of the cover plate, and to prevent renewed fogging.

According to a very advantageous embodiment of the headlight according to the invention, it has at least one temperature sensor which, together with a control device for controlling the Peltier element and the twin fan of the temperature control module according to the invention, is set up to influence the temperature of the headlight. A heating or cooling requirement in the internal volume of the headlight can thus be determined via the temperature sensor(s) and this can be monitored and controlled accordingly, preferably by further temperature sensors, at least one of which is arranged in the area of the air flowing out of the temperature control module.

Even if in principle the use of such a headlight is suitable for all possible applications, it may, in particular, be intended to be used as a front headlight in a vehicle, in particular in a motor vehicle and here preferably in a non-rail-bound land vehicle such as a car or lorry.

The method according to the invention for operating a temperature control module according to the invention in a headlight according to the invention provides for the Peltier element, in the case of a cooling requirement, to be used in a first electrical polarity to cool the first side and to discharge the heat to the second side in order to cool the internal volume and/or to collect condensate in the collection volume of the temperature control module. Furthermore, the method provides for the Peltier element, in the case of a heating requirement, to be used in reverse polarity to heat the first side in order to keep it free of fogging or to dissolve fogging that has already occurred or to ensure an ice-free cover plate, i.e., to defrost it if necessary and subsequently keep it ice-free.

Further advantageous embodiments of the temperature control module according to the invention, of the headlight according to the invention and of the method according to the invention result from the exemplary embodiment which is described in more detail below with reference to the figures.

BRIEF DESCRIPTION OF THE DRAWING FIGURES

Here:

DETAILED DESCRIPTION

Figure 1:
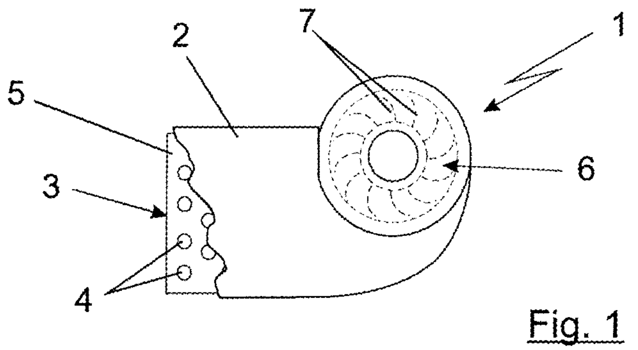
FIG. 1 shows a side view of a possible embodiment of a temperature control module according to the invention in partial section.

In the representation of FIG. 1, an integrated temperature control module, marked in its entirety with 1, can be seen in a side view. A housing 2 of the integrated temperature control module 1 is partially shown in a sectional view, in order to reveal a separation element 3 with some indicated heat-conducting elements 4 on the side 5 facing towards the observer. These heat-conducting elements 4 can be designed as cooling pins, for example. In addition to this separation element 3, a twin fan 6 is integrated into the housing 2, which is designed as a radial fan, wherein one of the radial fan wheels 7 in the housing is marked with a dashed line, since it is covered by the actual housing 2.

Figure 2:
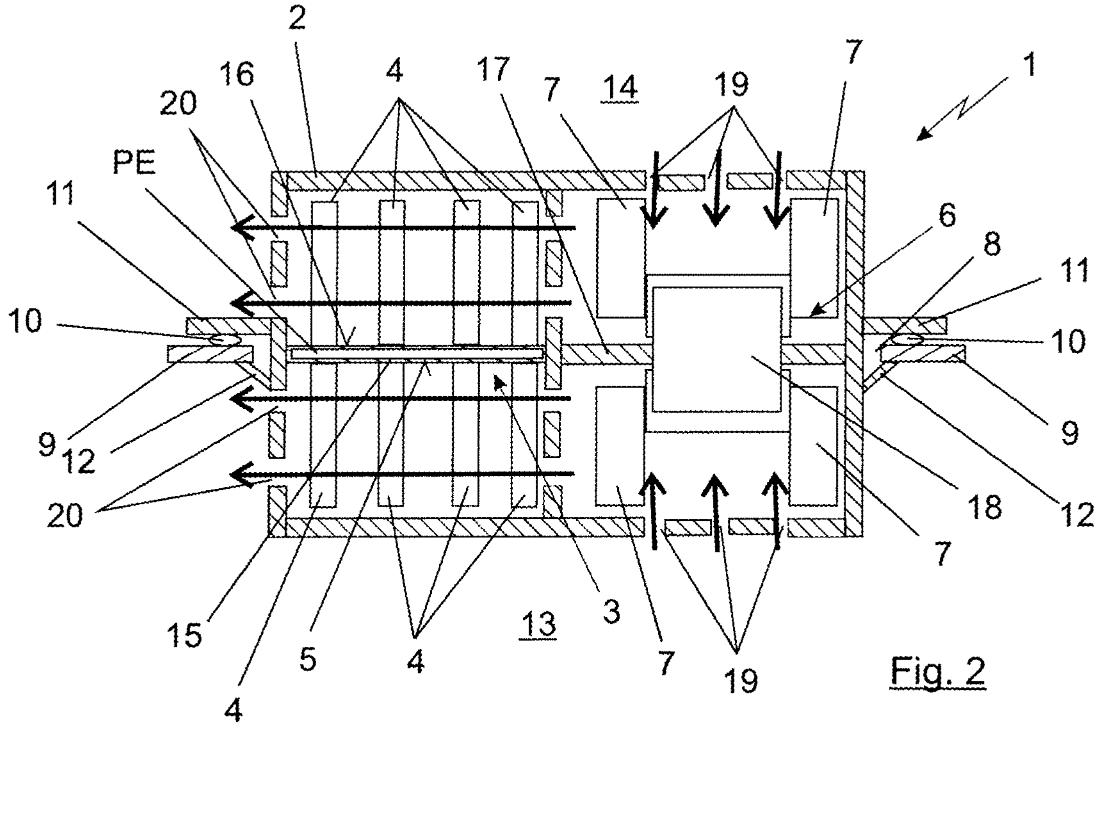
FIG. 2 shows a plan view of the temperature control module according to FIG. 1 in a sectional view.

The functionality can be represented best in the plan view, which can be seen in the sectional view of FIG. 2. The housing 2 of the temperature control module 1 is accommodated in an opening 8 of a wall labelled 9. A peripheral seal 10 between the wall 9 and a flange 11 is provided on the housing. The connection can, for example, be achieved by glue, screws, rivets, or similar. In particular, it can be achieved by clip connection, which is why in the representation of FIG. 2, clips 12 can be seen as a part of the housing. If the housing in the representation of FIG. 2 is inserted from above into the opening 8, then it can be simply and efficiently clipped to the wall 9, preferably with deformation of inserted the seal 10, so that the construction is completely sealed off.

An internal volume marked with 13 is intended to be below the wall 9, and an external volume marked with 14 is intended to be above it in the surroundings of the temperature control module 1. Heat is now to be transferred from the one into the other of the two volumes 13, 14 via the temperature control module 1. During cooling of the internal volume 13, i.e., from the internal volume 13 into the external volume 14 forming the surroundings of the construction. The separation element 3 has a closed middle section 15, which is included in the housing 2 such that the area facing towards the internal volume 13 is sealed against the area facing towards the external volume 14. The first side 5 of the separation element 3 or its middle section 15, which is facing downwards here, carries some of the heat-conducting elements 4, as does the opposite second side 16. In the separation element 3 or the middle section 15, a Peltier element PE is also arranged as a thermoelectric cooler or heater. Depending on the control or electrical polarity, heat can be transported from the first to the second side 5, 16, so that the internal volume 13 is cooled, or vice versa so that the internal volume 13 is heated. The cool or hot air is circulated by the fan wheels 7 of the twin fan 6 in the internal volume 13 and the waste heat or emitted cold is discharged into the external volume 14 surroundings.

The sealing of the area adjacent to the two sides 5, 16 continues through the housing and is extended by an intermediate wall 17 which is arranged flush to the middle section 15 of the separation element 3. This intermediate wall 17 has an opening for an electric drive motor 18 which is a part of the twin fan 6 and drives two impellers 7 with their respective guide vanes in parallel. The area of the two impellers 7 is also sealed off from each other by the intermediate wall 17 and the drive motor 18, so that the internal volume 13 can be sealed off from the external volume 14 when the housing 2 is installed in the opening 8 of the wall 9 in a sealed manner.

On the lower side, facing towards the internal volume 13, of the temperature control module 1 shown, air is now drawn in from the internal volume 13 via air inlet openings 19 and is conveyed by the guide vanes of the rotating impellers 7 between the heat-conducting elements 4 of the first side 5 of the separation element 3. The same also applies for the opposite side 16 of the middle section 15. In this case too, air is drawn in, this time from the external volume 14, i.e., the surroundings, via the supply air openings there, also marked 19, and conveyed between the heat-conducting elements 4 of the second side 16 of the middle section 15. The air flowing out then passes through outlet openings 20 on both sides back into the internal volume 13, which is shown at the bottom in FIG. 2, and into the external volume 14, which can accordingly be seen at the top.

The air conveyed via the rotating impellers 7 of the twin fan 6 therefore remains unmixed, depending on whether it is conveyed from the internal volume 13 or the external volume 14, so that the two air flows are only in heat-conducting contact with each other via the middle section 15 and the heat-conducting elements 4. In principle, this alone would enable heat exchange between the two air flows. This is supported by the Peltier element PE, which is designed to be integrated in the middle section 15 in the exemplary embodiment represented here. The Peltier element PE could also form this middle section 15 completely, so that the heat-conducting elements would be arranged directly on the Peltier element PE. The temperature control module 1 is now able to cool, for example, in the area of the internal volume 13, in that heat is emitted to the air flow from the external volume 14 and in that the Peltier element PE is polarized in such a way that the cold side is on its side facing towards the internal volume 13 and the hot side is on the side facing towards the external volume 14. In addition to such cooling, it is also possible to heat the air flow for the internal volume 13, in which case the polarity of the Peltier element PE would be reversed so that the cold side is on the side facing the external volume 14 and the warm side is on the side facing the internal volume 13.

The separation element 3 or at least its middle section 15 and the heat-conducting elements 4 can preferably consist of a good heat-conducting material, for example aluminum. The twin fan 6 moves, in addition to the impeller 7 shown at the bottom in the representation of FIG. 2, the impeller 7 with the guide vanes shown at the top in the representation of FIG. 2. The two impellers can be arranged on one and the same shaft of the common electric drive motor 18 and thus rotate at the same speed. A gearbox for changing the rotational speed of one of the impellers would also be conceivable in principle. The impellers 7 are preferably constructed analogous to each other.

Figure 3:
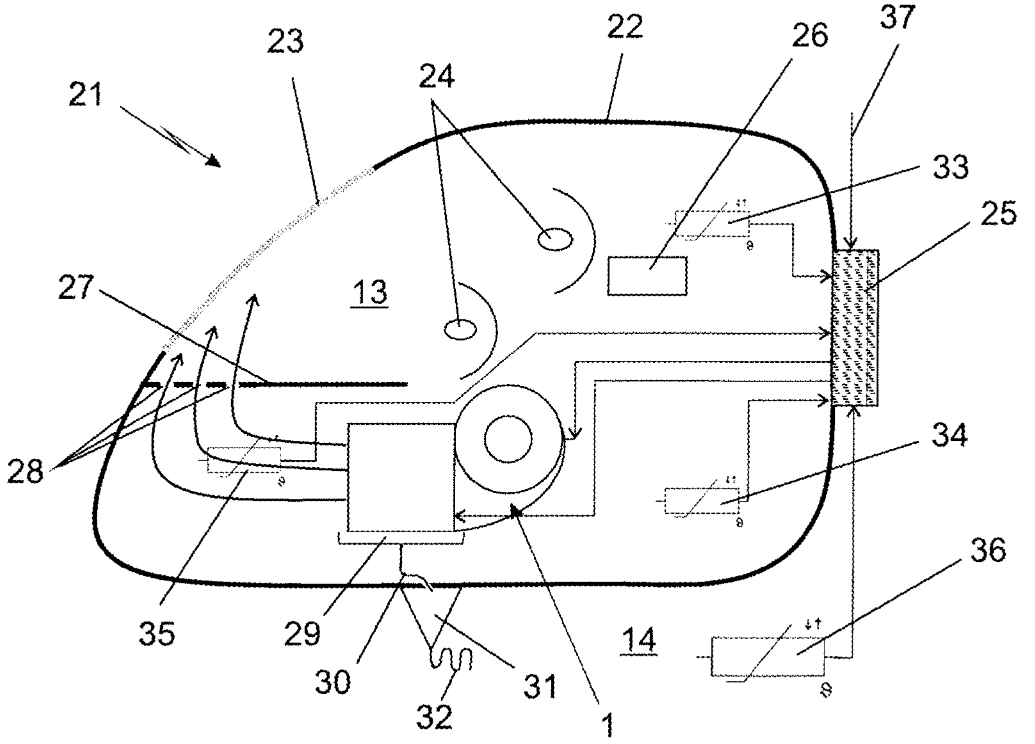
FIG. 3 shows a schematic representation of a vehicle headlight in an embodiment according to the invention.

The temperature control module 1 can, in particular, be used with a headlight 21 shown in FIG. 3. Its construction consists of a housing 22 and a transparent cover plate 23. Purely by way of example, two boxes 24 with light-emitting diodes are arranged below this cover plate 23. Furthermore, a control device 25 and a stepper motor 26 are shown by way of example inside the housing 22 or as indicated here on the housing 22. These elements that are in the internal volume 13 of the headlight 21 or in heat-conducting contact with the latter produce waste heat. The temperature control module 1, as shown in FIG. 3, is now integrated into the headlight 21 in order to improve the cooling of this waste heat in order to achieve high performance of the components within the internal volume 13 of the headlight 21 without overheating these components. Parts of the housing 22 form the wall 9 shown in FIG. 2. The temperature control module 1 is therefore used, for example, to transfer heat from the internal volume 13 of the headlight 21 to the volume surrounding the headlight 21, which corresponds to the external volume 14 in the construction shown in FIG. 2. Furthermore, the internal volume 13 of the headlight 21 itself can be sealed, in order to prevent the penetration of large quantities of moisture which could damage the electric and in particular optical components inside the headlight 21. In addition to the cooling required for the vast majority of operating situations, i.e., the removal of waste heat from the electronic components 24, 26, and 25 from the internal volume 13 of the headlight 21, the construction of the temperature control module 1 with the Peltier element PE also makes it very easy to heat the internal volume 13, for example to keep it free of fogging or to remove ice. This applies in principle to the entire internal volume 13, in particular, however, to the area of the cover plate 23.

Therefore, the construction provides that, when used as intended, a cover 27 is arranged in the direction of gravity g below the area in which the cover plate 23 merges into the non-transparent housing 22. This cover 27 has ventilation openings 28. The air conveyed by the temperature control module 1 in the internal volume 13 of the headlight 21 now collects below this cover 27 and flows through the ventilation openings 28 guided specifically in the area of the cover plate 23 upwards, in order then to flow in the loop via the illuminating elements 24, the optional stepper motor 26 and the area in which the control device 25 is connected to the housing 22, back to the temperature control module 1 This circulatory flow enables good cooling inside the headlight 21 or also good heating in particular of the cover plate 23 if this is iced over and/or fogged up.

As already explained above, the aim is to prevent the penetration of relatively large quantities of moisture into the internal volume 13 of the headlight 21 where possible. In practice, however, this is often not completely successful, since the construction of the headlight 21 with its housing 22 can never be implemented in a completely sealed manner. One reason for this is that pressure equalization is necessary, which requires the use of a membrane that is permeable to air but not to water vapor. This leads to interfaces inside the housing 22 that can only be well sealed with great effort. Furthermore, the plastic typically used for the housing 22 is not completely sealed against moisture, so that moisture can also diffuse into the interior of the headlight 21. A certain amount of residual moisture can therefore never be excluded.

The headlight 21 according to the invention therefore does without such a membrane, which in principle could optionally also be present. Instead, it uses a collection volume 29 for condensate in the area of the temperature control module 1 and here on its side 5 facing towards the internal volume 13. This collection volume 29, when used as intended, is arranged at the bottom in the direction of gravity, the direction of which is indicated symbolically here by the gravitational acceleration g. Moisture, which is circulated by the twin fans in the internal volume 13 of the headlight 21, condenses on the first side 5 or in the area of the heat-conducting elements 4 of this side 5 and drips into the collection volume 29. This is connected via a duct element 30 to a sump volume 31, which is arranged outside the housing 22, but is sealed off from the latter, however.

Figure 4:
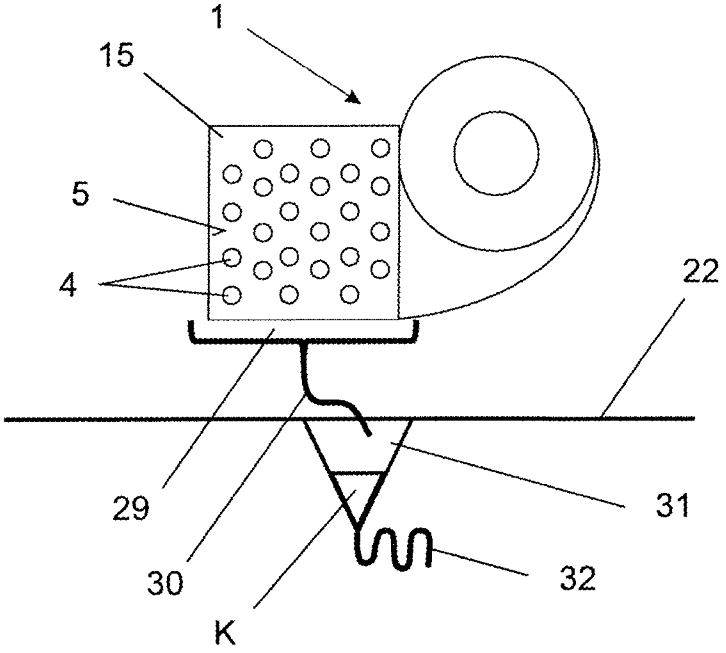
FIG. 4 shows an enlarged representation of a device for equalizing pressure and for discharging condensate in and from this headlight.

In the representation of FIG. 4, an enlarged construction of this is represented. The side 5 of the middle section 15 is drawn with its heat-conducting elements 4 inside the temperature control module 1. The view according to FIG. 4 is to be the view from the internal volume 13 out onto the part of the temperature control module 1 extending into the internal volume 13. The cooling by the Peltier element PE, not seen here, ensures condensation of any moisture present in the internal volume 13. This collects in the direction of gravity g at the bottom in the collection volume 29 and flows via the duct element 30 into the sump volume 31. The duct element 30 ends at the top in the sump volume 31 in the direction of gravity when used as intended, so that condensate exiting from the duct element 30 drips into the sump container 31 and collects at the bottom of the latter in this direction of gravity g. The collected condensate is drawn in the representation of FIG. 4 and marked with the letter K. The sump volume 31 is correspondingly connected to the surroundings, in this case the external volume 14, via a meandering tube 32. The construction of the condensate discharge therefore creates a connection between the internal volume 13 and the external volume 14, in which, due to the arrangement of the end of the duct element 30, condensate cannot be sucked back into the internal volume 13 during normal use, even when the internal pressure is to be lower here than in the area of the external volume 14.

The water condensed and collected by the corresponding operation of the Peltier element PE as a cold trap is located now as condensate K in the sump volume 31. If the air pressure in the internal volume 13 of the headlight 21 now increases, for example due to the operation of the heat sources or also due to a reduction in the ambient pressure because the vehicle equipped with the headlight 21 drives up a hill, for example, then the accumulated condensate K is pressed outwards through the meandering tube 32 into the surroundings, i.e., the external volume 14. If the sump volume 31 is empty then the residual air flows unhindered in the internal volume 13 due to the excess pressure, and the pressure equalizes. In the reverse case, i.e., when the air pressure in the internal volume 13 falls compared to the air pressure in the external volume 14, air can be drawn inwards through the meandering tube 32. If there was condensate K in the sump container, air bubbles would form there and rise in order to equalize the pressure. Due to the typical distance between the surface of the condensate K and the duct element 30, which ends at the top in the direction of gravity g when used as intended, no water or condensate K enters the internal volume 13. With an empty sump volume 31, the air would flow directly back into the internal volume 13.

Thus, a simple and efficient connection between the internal volume 13 and the external volume 14 would be created in order, on the one hand, to be able to discharge any condensate and, on the other hand, to equalize the pressure. Because it is possible to achieve very efficient and active cooling via the temperature control module 1 with the Peltier element PE, the sealing of the headlight 21 against the surroundings is no longer as relevant, since any condensate can be discharged before the moisture could damage components in the interior of the headlight 21.

The tube 32 is designed in a meandering shape in order to prevent dust and dirt getting into the interior of the headlight 21. Additionally, a fine net or grate, not shown here, could be mounted on the end of the tube 32 in order to prevent coarse dirt from clogging the tube 32 or insects from nesting in the area of the tube 32.

The control device 25 already shown in FIG. 3 takes over control and monitoring of the entire process. It is connected, on the one hand, to the Peltier element PE in the temperature control module 1 and, on the other hand, to different temperature sensors 33, 34, 35 in the interior of the headlight 21. Additionally, further vehicle signals, such as, for example, the temperature detected via a temperature sensor 36 in the external volume 14 or data about the air pressure etc., that is indicated here by the arrow 37, can be made available to the control device 25. On the output side, the control device 25 can now control the Peltier element PE and the drive motor 18 of the twin fan 6 of the temperature control module 1 accordingly in order to control or regulate the temperatures within the internal volume 13 of the headlight 21 and to supply the Peltier element PE with power according to the desired polarity in order to operate it as a heating or cooling element, as required. In order to reverse the polarity of the flow for the Peltier element PE, for example an H-bridge can be used. As a result, it is possible in the summer to cool with the Peltier element PE and to dry the air. In the winter it can be used for heating in order to keep the cover plate 23 free from fogging and/or ice.

The control device 25 can furthermore take control of the lighting and the stepper motor 26; in principle, however, several separate control units would also be conceivable.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A device comprising:

a temperature control module comprising a separation element with a closed middle section having a first side and a second side, and heat-conducting elements on the first and second sides of the closed middle section; and an integrated twin fan configured to convey ambient air from the first side of the middle section and to convey ambient air from the second side of the middle section to the separation element, wherein the closed middle section has a Peltier element or the closed middle section is the Peltier element;

a collection volume, configured to collect condensate, arranged on one of the first and second sides;

a sump volume; and a duct element coupling the collection volume to the sump volume to discharge the condensate.

2. The temperature control module of claim 1, wherein the twin fan comprises:

two fan wheels sealed off from each other; and an electric drive motor configured to drive the two fan wheels.

3. The device of claim 1, wherein the duct element ends at a top in the sump volume in a direction of gravity.

4. The device of claim 1, wherein the sump volume is connected to the surroundings via a meandering tube arranged at a bottom in a direction of gravity.

5. A headlight comprising:

a self-enclosed internal volume;

a transparent cover plate;

illuminating means;

means for mechanical or electric control of the illuminating means; and a temperature control module comprising a separation element with a closed middle section having a first side and a second side, and heat-conducting elements on the first and second sides of the closed middle section;

an integrated twin fan configured to convey ambient air from the first side of the middle section and to convey ambient air from the second side of the middle section to the separation element, wherein the closed middle section has a Peltier element or the closed middle section is the Peltier element, wherein the closed middle section forms a part of a boundary of the internal volume so that the heat-conducting elements of the first side of the closed middle section extend into the internal volume and the heat-conducting elements of the second side of the closed middle section extend into surroundings of the headlight; and a collection volume, configured to collect condensate, arranged on one of the first and second sides, wherein the collection volume is arranged in the internal volume and is connected via a duct element to a sump volume for the condensate to discharge the condensate.

6. The headlight of claim 5, wherein the duct element ends at a top in the sump volume in a direction of gravity.

7. The headlight of claim 5, wherein the sump volume is connected to the surroundings via a meandering tube arranged at a bottom in a direction of gravity.

8. The headlight of claim 7, wherein a flow-through cross-section of the meandering tube has a grate or filter element.

9. The headlight of claim 5, further comprising:

a cover with ventilation openings, wherein the temperature control module is arranged in the internal volume below the cover at least in relation to air flow conveyed by the temperature control module.

10. The headlight of claim 5, further comprising:

at least one temperature sensor; and a control device connected to the at least one temperature sensor, wherein the control device is configured to at least control the Peltier element and the twin fan.

11. The headlight of claim 5, wherein the headlight is a front headlight of a vehicle.

12. A method of operating a temperature control module in a headlight, wherein the headlight comprises a self-enclosed internal volume, a transparent cover plate, illuminating means, and means for mechanical or electric control of the illuminating means, wherein the temperature control module comprises a separation element with a closed middle section having a first side and a second side, and heat-conducting elements on the first and second sides of the closed middle section and an integrated twin fan configured to convey ambient air from the first side of the middle section and to convey ambient air from the second side of the middle section to the separation element, wherein the closed middle section has a Peltier element or the closed middle section is the Peltier element, wherein the closed middle section forms a part of a boundary of the internal volume so that the heat-conducting elements of the first side of the closed middle section extend into the internal volume and the heat-conducting elements of the second side of the closed middle section extend into surroundings of the headlight, wherein the temperature control module further comprises, a collection volume, configured to collect condensate, arranged on one of the first and second sides, the method comprising:

applying electricity to the Peltier element so that the Peltier element has a first electric polarity so that the Peltier element cools the first side and discharges heat to the second side to cool the internal volume and collect the condensate in the collection volume; and applying electricity to the Peltier element so that the Peltier element has a reverse electric polarity so that the Peltier element heats the first side to remove fog or ice from the transparent cover plate.

* * * * *